United States Patent [19]

Douno et al.

[11] Patent Number: 4,686,357
[45] Date of Patent: Aug. 11, 1987

[54] METHOD FOR CONFIRMING SETTLED CHECK CARDS AND CHECK CARD DRAWING APPARATUS

[75] Inventors: Shugo Douno; Hiroshi Tomiyama, both of Himeji, Japan

[73] Assignee: Glory Kogyo Kabushiki Kaisha, Hyogo, Japan

[21] Appl. No.: 746,982

[22] Filed: Jun. 19, 1985

[30] Foreign Application Priority Data

Jul. 27, 1984 [JP] Japan .................. 59-157065

[51] Int. Cl.$^4$ .............................. G06K 5/00
[52] U.S. Cl. ................... 235/379; 235/419; 235/489
[58] Field of Search .............. 235/379, 489, 419

[56] References Cited

U.S. PATENT DOCUMENTS

3,624,357  11/1971  Wright ........................ 235/489
4,053,735  10/1977  Foudos ........................ 235/379 X
4,321,672  3/1982  Braun .......................... 235/379 X Primary Examiner—Harold I. Pitts
Attorney, Agent, or Firm—Koda and Androlia

[57] ABSTRACT

In commercial transactions, settlement is conventionally made by cash or by checks drawn from a current account in a bank. Users of such checking system enjoy the convenience. In the conventional process of check negotiation, however, such system involves a vast amount of complicated procedures including several steps of mechanical processing as well as manual handling. There is also a risk of illicit use if the check book is lost or stolen unless the loss or theft thereof is reported to the bank immediately. Collation of the settled checks returned to the drawer with the record of drawing further complicates the process. This invention method enables to process a drawn check card, and identify a settled check card with an automatic and yet simple operation, thus improving the check card negotiation system.

15 Claims, 10 Drawing Figures

METHOD FOR CONFIRMING SETTLED CHECK CARDS AND CHECK CARD DRAWING APPARATUS

BACKGROUND OF THE INVENTION

1. Field of the Invention

The present invention relates to a check negotiation system using a check card which is provided with a magnetic striped, particularly to a confirming method of a check card which enables the drawer to automatically collates the subject transaction when the settled check is returned to the drawer, and a check card drawing apparatus.

2. Description of the Prior Art

In conventional commercial transactions, settlement is by cash, and by checks drawn on a current account in a bank, etc. Users of such checking system enjoy its advantages. From the standpoint of banks, however, such system involves a vast amount of complicated clerical procedures, and a number of negotiation checks pose a bottleneck in rationalizing the banking business.

We will now briefly refer to the procedure for handling checks at a bank, etc. A user such as a firm or an entreprenuer opens a current account with a bank based on which the bank issues a check book containing a number of checks printed with the user's account number (including the bank and branch codes) by means of, for example, magnetic ink character recognition (MICR). The user draws a check by writing a sum of money by hand or by a check-writer. The recipient then sumbits the check to a clerk at his/her bank to be deposited in his account. The bank first records all such checks on a microfilm and then print thereon the respective amount using a MICR encoder. The checks then are sorted out into their own checks and other bank checks. Those checks issued by other banks are stamped for clearing and are brought to a regional clearing house to which the bank (or branch) belongs. Checks from different banks collected at the clearing house are sorted out according to banks by means of an MICR reader/sorter, and a balance sheet of different banks is also made. Each bank takes back its checks and confirms the balance of the drawer's account. This is done within a predetermined period of time (i.e., one day after clearing). For the cases with insufficient fund in the account during this period, the bank which received such checks is notified of the conditions so that the amount thereof is credited to the bearer's account. Upon expiration of such period, the drawn amount is automatically credited to the bearer's account in other cases and the bank concerned settles payment according to the balance sheet mentioned above. As for the own checks issued by themselves, the fund of the drawer's account is confirmed by means of an on-line system and if sufficient, the check is honored and credited to the bearer's account.

In the United States, a bank sorts out their own checks, classifies them by the account numbers and sends them to the drawers (ex. collectively once a month). The drawer who receives there settled checks collates them with the note he made when drawing these checks and confirms if the settlement by check has been correctly made.

The prior check negotiation system as mentioned above involves complicated and multiple procedure of both manual and mechanical steps. There is also a risk of illicit use if the check book mentioned above is lost or stolen and the loss or theft thereof is not reported to the bank, etc. immediately. Thus the applicant of the present invention disclosed in Japanese Patent Application No. 237275/1983 a check negotiation system which enables checks to be cashed with a minimum manual handling once the check has been received by a financial institution such as a bank, and a check card and an apparataus for drawing check to prevent illicit use of such a card when lost or stolen. Such a check card drawing apparatus, however, still requires complicated manual handling in collating the settled check cards with the drawing record of these check cards when they are returned to the drawer.

SUMMARY OF THE INVENTION

The present invention aims to provide a confirming method which enables secure and easy collation of the processed and settled check card with the drawing record.

The present invention also aims to provide a safe and secure check card drawing apparatus which enables check negotiation with least manual handling after a check has been received a financial institution.

According to this invention for achieving the objects described above, is one aspect thereof, there is provided a check card negotiating system for crediting a sum of money to a designated account or cashing the same by the steps of inserting a check card into a check card drawing apparatus to input necessary data such as the amount of money for processing, identifying the authenticity of the check card and drawing a check and, inserting the card of said drawn check into check card insertion slit interconnected to note/coin processor such as an automatic cash dispensing machine, automatic cash depositing/dispensing machine or teller's machine to judge its authenticity, a method for collating settled check cards which is characterized in that data for drawing of a check card are stored in the check card drawing apparatus at the time of drawing so that when the check card is inserted into the check card drawing apparatus after settlement and its data are read out, the check card may be marked as void depending on whether or not the data on the drawing and the data read out coincide.

In another aspect of this invention, there is provided a check card drawing apparatus comprising a keyboard for inputting data, a display means to display the data inputted by said keyboard, a data read-out/write-in means which read out the data written on a magnetic stripe of a check card inserted into an insertion slit and writes in necessary data on said magnetic stripe, a transaction memory which separately stores the data inputted by said keyboard and the data read out from said magnetic stripe for each check card, and a processing unit which judges whether or not a bank process code is recorded on said magnetic stripe when the data on said check card is read out, and if recorded, judges whether or not data corresponding to the data on said magnetic stripe is stored in said transaction memory, and turn on a corresponding flag in the transaction memory at a prescribed condition.

The nature, principle and utility of the invention will become more apparent from the following detailed description when read in conjunction with the accompanying drawings.

DETAILED DESCRIPTION OF THE INVENTION

Figure 1:
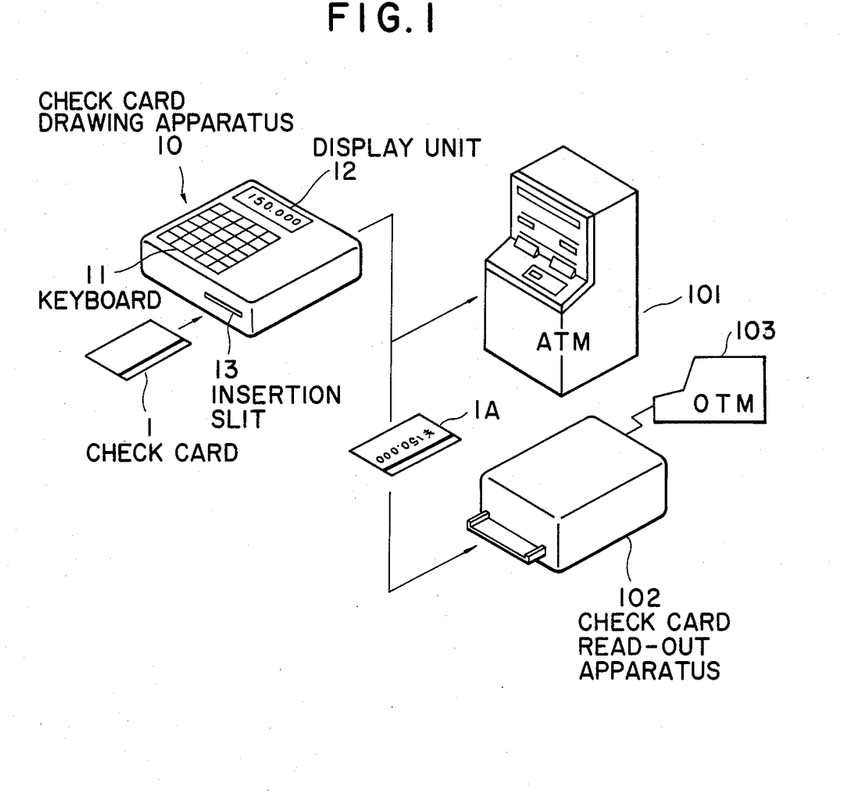
FIG. 1 is a structual view showing one example of the check negotiating system.
Figure 2A:
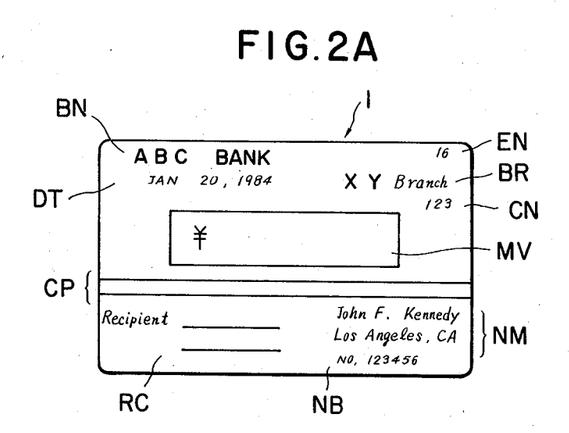
FIGS. 2A and 2B are a front and a back view of one example of the check card to be used in the present invention.
Figure 2B:
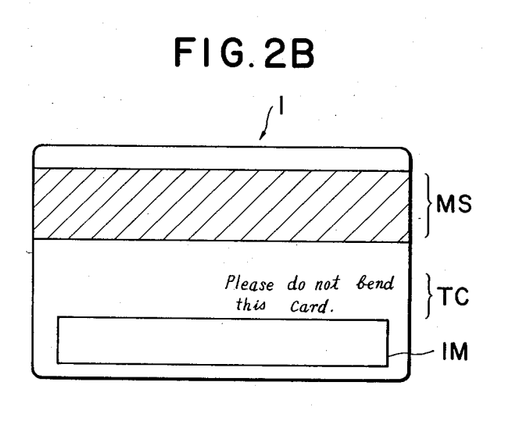

Referring to FIG. 1 which shows the outline of the check negotiating system according to the present invention using a check card 1, a person who holds a current account at a bank writes in data such as the monetary amount on the check card 1 provided by the financial institution in advance and draws a check (check card 1A) using a portable and compact check drawing apparatus 10. The check card 1 is a rectangular sheet of paper similar to those widely used as a cash card (so called as quick card, bank card, etc.) provided with a magnetic stripe MS on a part of its back for writing-in and reading-out data as shown in FIGS. 2A and 2B. The check card 1 may be made of hard paper and is provided at a predetermined position on the front with an identification area CP to optically read out identification characteristics specifically assigned to each check card 1. Above the identification area CP is an area for the amount of money MV for printing the amount of a check to be drawn. Data in the identification area CP of the check card 1 may be read out by a characteristic reader and by a reading-out method such as those described in the Japanese Patent Applications Laid-Open under Nos. 97187/1982 and 97188/1982. The characteristic data specific to each check card 1 is read out and recorded on the magnetic stripe MS before the check card 1 is handed out from a financial institution to a user who has opened a current account or when issued from an automatic check card issuing apparatus (not shown). The user's account number is also recorded on the magnetic stripe MS. The area MV for printing the monetary amount of a check card 1 not yet issued is naturally left blank. The check card 1 is also provided with a title column BN to indicate the name of a financial institution such as bank, a date column DT to print the date of drawing the check card 1, a clearing house number column EN to indicate the number allotted to a clearing house, a branch name column BR to indicate the name of a branch or the head office of the above financial institution and a serial number column CN to indicate the serial number of the check card issued. There are also provided below the identification area CP a drawee column RC to write the name of a person for whom the check is drawn (for example, bearer), a drawer column NM to indicate the address and name (title) of the drawer and an account number column NB to indicate the number of the current account. A column TC to give handling instructions of the check card 1, and an identification column IM for the drawee to fill in the name of the drawer to identify the drawer are provided on the back of the check card 1, too. These columns may be in any arbitrary combination or arranged on either side of the card.

A check card 1 as described above is inserted into an insertion slit 13 provided on the front side of the drawing apparatus 10, and taken in by means of a conveying mechanism to be described later. Necessary data is inputted by means of a keyboard 11 comprising then keys and symbol keys. The user can write out a check confirming the figure (amount) indicated on a display unit 12 which is provided at upper portion of the keyboard 11. When all the input operation is completed and the confirmation-key is pressed, the drawn amount on the keyboard 11 is printed in the area 4 and a check (check card 1A) with the amount and so on recorded on the magnetic stripe 2 is ejected from an ejection slit of the drawing apparatus 10. The check card 1A is then delivered to the drawee (creditor) by the drawer.

A user who has received a check card 1A thus drawn inserts the same into an isertion slit which may be provided exclusively or the slit for inserting cash card may be used by an automatic teller's machine (ATM) for automatically paying into his account via an on-line system. In the case where the check card has been issued within the same branch of a bank, it can be cashed on the spot. By inserting the check card 1A into an exclusive check card read-out apparatus 102 connected to an on-line teller's machine (OTM) 103 installed at teller's window, the check card 1A can be credited to the bearer's account by on-line system. When a check card is to be credited to an account or cashed via ATM 101 or OTM 103, whether there remains sufficient fund in the drawer's account is essential. Therefore, the check processing apparatus enables confirming the fund in the drawer's current deposit via ATM 101 or OTM 103 and allows crediting or cashing for an amount of money within the limit of the fund. When a drawer wishes to write in the amount on the check card 1 by the drawing apparatus 10 wihout knowing for sure how such fund is in his account, he may refer directly to the bank by telephone or the like, or the fund may be checked automatically by connecting an acoustic coupler to the check card drawing apparatus 10. This way, a check card may be surely drawn within the limit.

Figure 3:
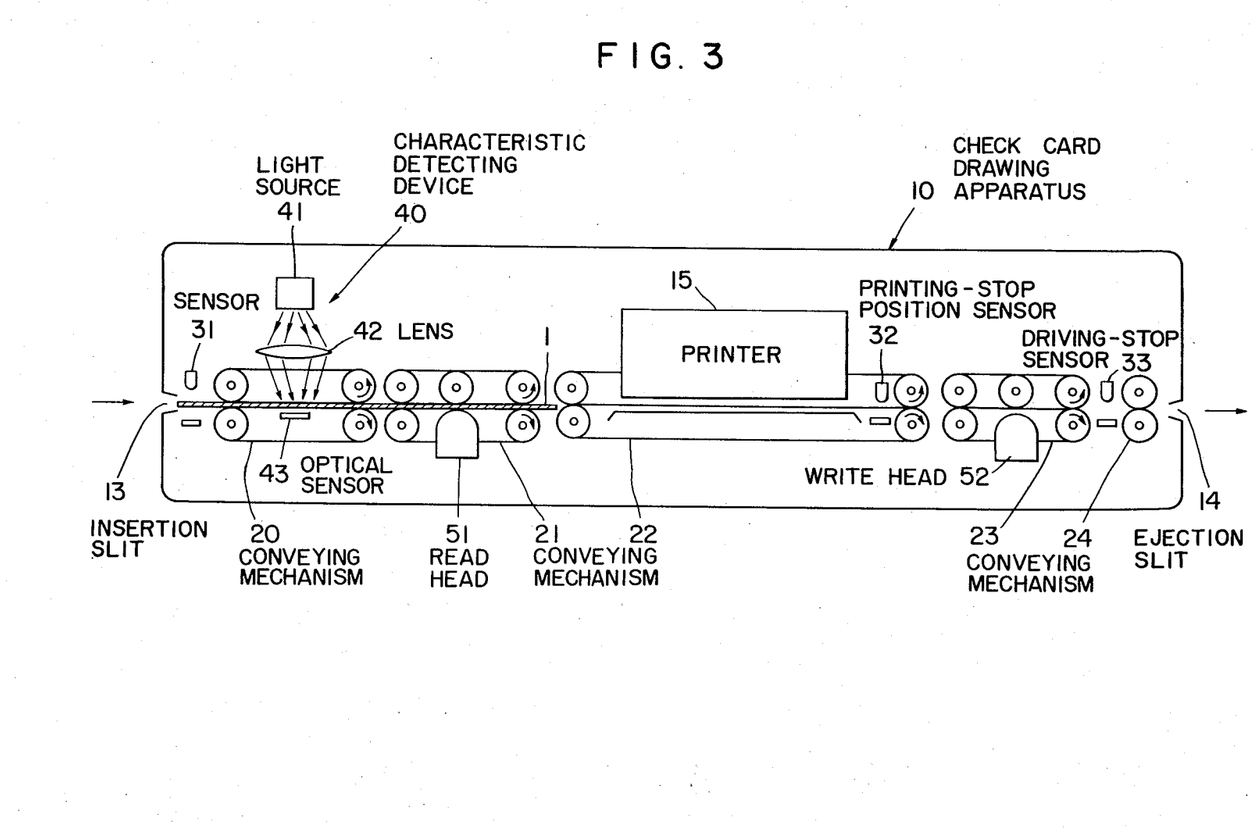
FIG. 3 is a schematic diagram showing the check card drawing apparatus according to the present invention.
Figure 4:
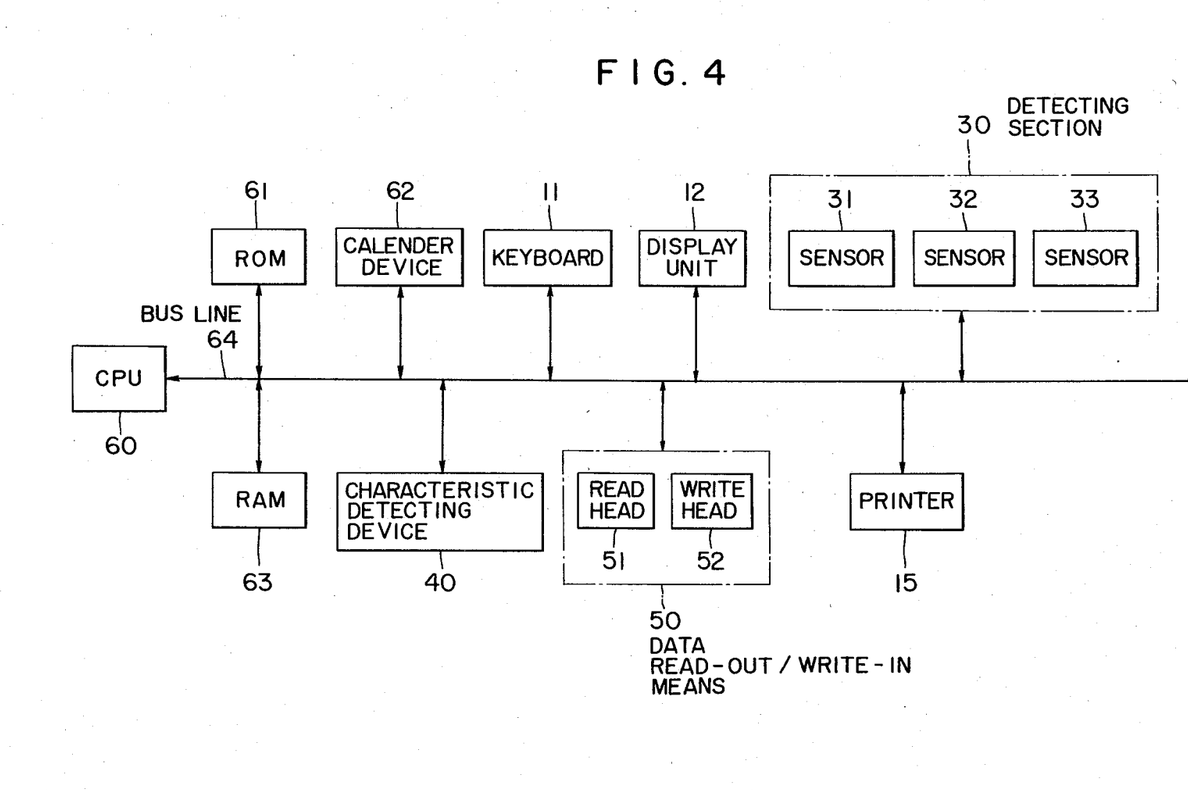
FIG. 4 is a block diagram showing the control system therefor.

FIG. 3 shows a schematic diagram of the check card drawing apparatus 10 and FIG. 4 a block diagram to show its control system.

The check card 1 inserted into an insertion slit 13 is conveyed to an ejection slit 14 via a conveying mechanisms 20 to 24 driven by a motor. The conveying mechanisms 20 to 23 convey the check card 1 which is interposed between a pair of upper and lower belt conveyors wound around a pair of rollers, respectevely. A sensor 31 comprising a light emitting element and a photo-sensitive element is provided immediately adjacent to the insertion slit 13 for optically detecting insertion of a check card. A printing-stop position sensor 32 comprising a light emitting element and a photo-sensitive element is provided at the rear of the conveying mechanism 22 for detecting the check card 1 taken in and stopping the same at a predetermined position for printing. At an intermediate point between the conveying mechanism 23 and 24, a driving-stop sensor 33 is provided to detect that the check card 1 has been ejected from the ejection slit 14 and to stop the conveying mechanisms 20 to 24 for a predetermined period of time.

These sensors 31 to 33 constitute a detecting section 30. A characteristic detecting device 40 is provided at an intermediate position of the conveying mechanism 20 for reading out an optical characteristics specific for the inserted check card 1. The light emitted from a light source 41 is illuminated via a lens 42 on the check card 1 being conveyed by the conveying mechanism 20. The light penetrated through the identification area 3 of the check card 1 is detected by an optical sensor 43 comprising such device as a charge coupled device (CCD). The detection method described in the Japanese Patent Laid-open Nos. 97187/1982 and 97188/1982 is also applicable to the characteristic detecting device 40. A read head 51 is provided at the mid-portion of the conveying mechanism 21 for reading out the data written on the magnetic stripe 2 of the check card 1 and a write head 52 is provided in the conveying mechanism 23 for writing the data processed by a control system to be described later on the magnetic stripe 2 of the check card 1. The read head 51 and write head 52 constitutes data read-out/write-in means 50. The conveying mechanism 22 is provided with a printer 15 to print the data inputted by the keyboard 11 onto the area 4 of the check card 1. The conveying mechanism is halted when the printer 15 is actuated for printing.

Figure 5:
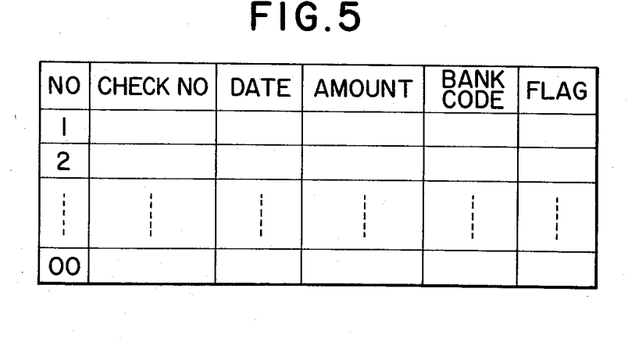
FIG. 5 is a view showing the content of the memory.

With the construction shown in the block diagram of FIG. 4, a CPU 60 (such as a micro-computer) controls the system as a whole. An operational program to be described later is stored in a ROM 61 while characteristic data detected by a characteristic detecting device 40 and data inputted by keyboard 11 are stored in a RAM 63 to be read out and processed whenever necessary. A calender device 62 comprises a clock circuit for storing the chronological data (including the time, data and the day of the week) at the time a check is drawn by the check card drawing apparatus 10 or writing the date and time of drawing on the check card 1. The ROM 63, the calender device 62, the RAM 63 and the keyboard 11 are inter-connected to the CPU 60 via a bus line 64. As mentioned in the above, the RAM 63 is provided with an area for tentatively storing the characteristic data detected by the characteristic detecting device 40 and the data inputted by the keyboard 11 as well as recording the drawing by the check cards. In other words, as shown in FIG. 5, the RAM 63 is provided with a transaction memory area which stores individual data such as the check number, the data and the amount drawn each time a check card is drawn. The bank code of the check card is also stored in the memory area. This transaction memory has a capacity which sufficiently accomodates the number of checks drawn by a drawer in a month, for example, a capacity for 100 checks.

The operation of the present invention will now be described referring the flow charts of FIGS. 6A through 6C and FIG. 7.

Figure 6A:
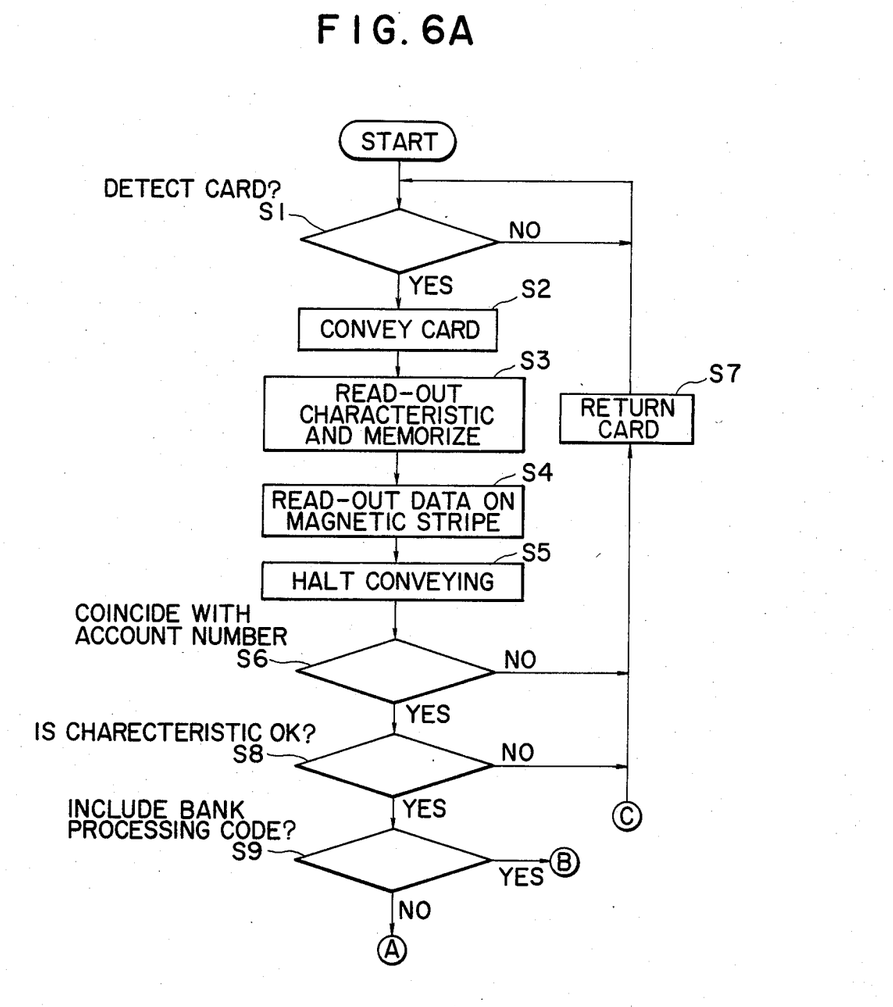
FIGS. 6A through 6C and FIG. 7 are flow charts showing one example of operation according to the present invention.

In order to draw a check using the check card drawing apparatus 10, a drawer inserts into an insertion slit 13 the check card 1 given to him in advance by a financial institution such as bank. An insertion sensor 31 detects the tip of the inserted check card 1 (step S1) and drives conveying mechanisms 20 to 24 via the CPU 60 to send the check card 1 into the drawing apparatus 10 (step S2). The characterisitic detecting device 40 provided at the mid-portion of the conveying mechanism 20 optically reads out the characteristic specific to the check card 1 and the read out data is stored in the RAM 63 step S3). The data such as the drawer's account number, check number, and characteristic of the check card recorded in the magnetic stripe MS in advance is read out by a read head 51 provided at the mid-portion of the conveying mechanism 21 (step S4). When the tip of the check card 1 reaches a printing-stop position sensor 32, the conveying mechanisms 20 to 24 are halted by means of the CPU 60 (step S5). Then, the CPU 60 judges whether or not the account number allotted by the bank in advance coincides with the account number read out by the read head 51 (step S6) as well as whether or not the characteristic data actually detected by the detecting device 40 coincide perfectly or with allowable and recorded on the magnetic stripe MS before it was detected and recorded on the magnetic stripe MS before it was given to the drawer by the financial institution (step S8). In the case where the account number and the characteristic data do not coincide or fall out of the allowable error, the conveying mechanisms 20 to 24 become reversed to return the check card 1 through CPU60 (step S7).

On the other hand, in the case where the account numbers coincide and the characteristic data either coincide or fall within the allowable error, it is judged whether the bank processing code is included in the data recorded in the magnetic stripe MS which was read in the above step S4 (step S9). The bank processing code is a code which is given to a drawn check card by a bank branch to which the card is brought for settlement. After identifying the bank processing code, the CPU 60 proceeds to the next routine (the routine in FIG. 6C) for collating the check card (settled check card) with the transaction area in the RAM 63. If the bank processing code has not been given, the CPU 60 proceeds to the drawing routine (the routine in FIG. 6B) of the check card (unused check card).

Figure 6B:
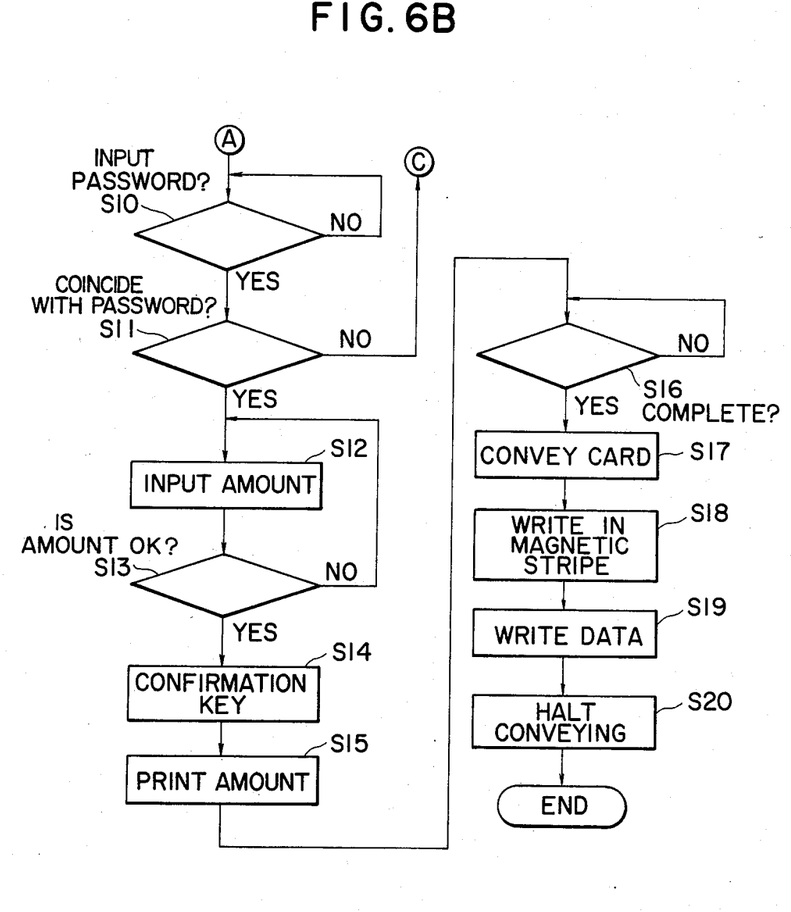

In the drawing routine FIG. 6, the drawer inputs via the keyboard 11 a password (such as a secret number) agreed in advance between the drawer and financial institution when the account was opened (step S10). If the passwords coincide, the amount in the check to be drawn is inputted via the keyboard 11 (steps S11 and S12). If the inputted password does not coincided with the one agreed, the drawer is judged as someone other than the one agreed by the financial institution. The check card 1 is therefore rejected as the conveying mechanisms 20 to 24 are reversed as described above (step S7). The amount of money inputted via the keyboard 11 is indicated on the display unit 12 provided at the upper portion of the drawing apparatus 10 and comprising a liquid crystal display, and the drawer confirms whether the displayed figure is the amount to be actually drawn out in check or not (step S13). If the amount is correct, the confirmation key on the keyboard 11 is pressed (step S14), whereby the printer 15 is actuated by the CPU 60 to print out the amount in figures in the area MV of the check card 1 which has been taken in the drawing apparatus 10 and halted (step S15). The reason why the amount is visibly printed out on the area MV of the check card 1 is because the user who receives the check card would feel insecure other wise and the credibility of the check card may be at stake.

When the printing operation in the area MV using the printer 15 is completed (step S16), the conveying mechanisms 20 to 24 are actuated by the CPU 60 and send the check card 1 toward the ejection slit 14 (step S17); in the meantime, the sum stored in the RAM 63 and the chronological data outputted from the calender device 62 are respectively written on the magnetic stripe MS via the write head 52. New characteristic data detected by the detecting device 40 and stored in the RAM 63 are written in a prescribed area on the magnetic stripe MS to update the data (step S18). This is done because the check card 1 may get soiled in the course of transaction and it is necessary to store the latest data. At the same time, chronological data concerning drawing from the calender device 62, the drawn amount, etc. are stored in the transaction area in the RAM 63, whereby the state of transaction for a day or of check drawing for one month may be tabulated and printed out by the printer 15 to ensure safe and smooth drawing (step S19). When the check card 1 is ejected from the ejection slit 14 and the sensor 33 detects the tail end of the check card 1, the driving of the conveying mechanisms 20 to 24 is stopped by the CPU 60 (step S20), whereby the drawing operation of the check card 1 is completed.

Figure 6C:
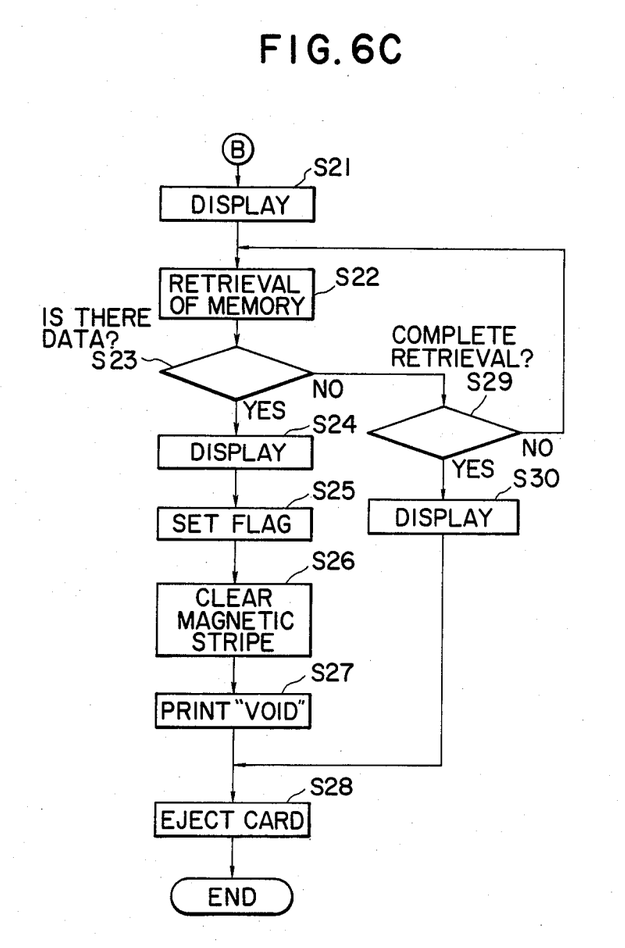

The collating routine is now described referring to FIG. 6C. When it is time to proceed, the display unit 12 displays this (step S21), and retrieval is made as to whether data corresponding to the data read out from the magnetic stripe MS are stored in the transaction memory in the RAM 63 (step S22). When the corresponding data are not stored, the display unit indicates this (steps S23, S29 and S30) and the check card is ejected and returned from the ejection slit 14 (step S28). If corresponding data are stored in the transaction memory, the display unit 12 also indicates this (steps S23 and S24). A flag of the corresponding memory area is set (step S25) and at the same time all the data written on the magnetic stripe MS are cleared (step S26). The printer 15 prints on the check card "void", etc. in letters, signs or marks (step S27) to make the check card void thereafter. The check card processed as void is ejected from the ejection slit 13 (step S28). Marking the card as void may also be done by punching.

Figure 7:
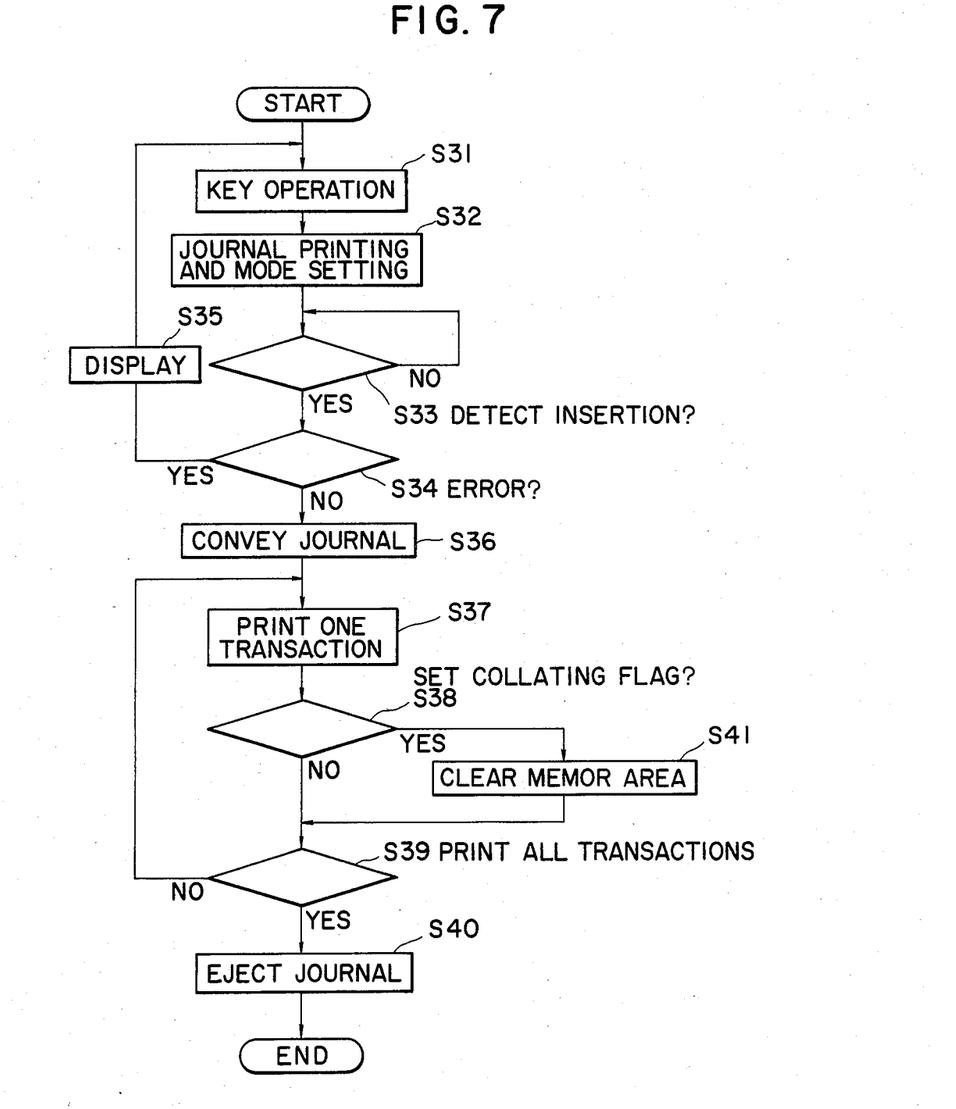

FIG. 7, on the other hand, shows the printing operation of the printer 15. Printing mode is effected by the operation of the keyboard 11 (step S31) and a journal for journal printing is set at the prescribed position on the printer 15 (steps S32 through S35). The journal is then conveyed for a prescribed amount (step S36) and the content of one transaction is read out from the transaction memory and printed (step S37). Subsequently, a collating flag in the transaction memory is set to judge whether the confirming operation is completed or not (step S38). If the collating flag is set, the memory area is cleared (step S41). When the clearing operation is completed or when a collating flag is not set, the operation then proceeds to judge whether printing of all the transactions is required or not (step S39). If printing of all the transactions is required, the operation returns to the above step S37. The journal is ejected when all the printing is completed (step S40).

The check card 1 in the above mentioned embodiment is made of paper. However, any material which reads out the characteristic data specific to a card may be used and the shape or the recording position of the check card may be arbitrarily changed. In the check card drawing apparatus mentioned above, the account number of the user is written is ROM and the account number is read out and collated with the account number written on the inserted check card to confirm whether the two numbers coincided with each other or not. However, it is possible to input the account number using the keyboard. In FIG. 7, the journal is inserted from the card insertion slit. However, a small-sized journal printer may be connected via an attachment to a check drawing apparatus to conduct journal printing using the data from the check drawing apparatus. The configuration of the above check drawing apparatus. The configuration of the above check drawing apparatus is optional and the position of the insertion and ejection slits for the check card may also be modified arbitrarily so long as the apparatus functions as explained in connection with FIGS. 3, 4 and 5. Various bank note processors such as an ATM and an OTM may also be used as an apparatus to accept the drawn check card.

As has been mentioned in the foregoing, the check card confirming method and the check card drawing apparatus according to the present invention enables automatic confirmation of drawn check cards which have been processed and settled by an easy operation is extremely advantageous in the check card negotiation system.

It should be understood that many modifications and adaptations of the invention will become apparent to those skilled in the art and it is intended to encompass such obvious modifications and changes in the scope of the claims appended hereto.

What is claimed is:

1. In a check card negotiating system for crediting a sum of money to a designated account or cashing the same by the steps of inserting a check card into a check card drawing apparatus to input necessary data such as the amount of money for processing, identifying the authenticity of the check card and drawing a check and, inserting the card of said drawn check into a check card insertion slit interconnected to note/coin processor such as an automatic cash dispensing machine, automatic cash depositing/dispensing machine or teller's machine to judge its authenticity, a method for collating settled check cards which is characterized in that data for drawing of a check card are stored in the check card drawing apparatus at the time of drawing so that when the check card is inserted into the check card drawing apparatus after settlement and its data are read out, the check card may be marked as void depending on whether or not the data on the drawing and the data read out coincide.

2. The method as claimed in claim 1, wherein said data for drawing include the account number, check number and identification figures of the check card.

3. The method as claimed in claim 1, wherein said void mark is printed in letters, symbols or marks on said check card.

4. The method claimed in claim 1 wherein said void marking is done by punching said check card.

5. The method as claimed in claim 3, wherein the record on drawing by said check card may be erased as well as said void marking is done.

6. The method as claimed in claim 1, wherein said data are recorded on a magnetic stripe provided on said check card.

7. The method as claimed in claim 1, wherein said settled check card includes bank processing code.

8. The method as claimed in claim 7, wherein it is judge whether or not said bank processing code is included in said inserted check card and the card is advanced to the check drawing step if said bank processing code is not included.

9. The method as claimed in claim 1 wherein said check card marked void is ejected.

10. A check card drawing apparatus comprising a keyboard for inputting data a display means to display the data inputted by said keyboard, a data read-out/- write-in means which reads out the data written on a magnetic stripe of a check card inserted into an insertion slit and writes in necessary data on said magnetic stripe, a transaction memory which separately stores the data inputted by said keyboard and the data read out from said magnetic stripe for each check card, and a processing unit which judges whether or not a bank process code is recorded on said magnetic stripe when the data on said check card is read out, and if recorded, judges whether or not data corresponding to the data on said magnetic stripe is stored in said transaction memory, and turn on a corresponding flag in the transaction memory at a prescribed condition.

11. The apparatus as claimed in claim 10 which further includes a process code memory section which stores a bank process code written on said magnetic stripe when it is read out.

12. The apparatus as claimed in claim 10 which further includes a characteristic detection device to detect the characteristic on the prescribed area of a check card.

13. The apparatus as claimed in claim 10 which further includes a calender device to store the chronological data on drawing a check or to write in the time and date at which the check is drawn on said check card.

14. The apparatus as claimed in claim 10, wherein said transaction memory separately stores the data such as the check number, the date the check is drawn, and the amount drawn as well as the bank code of said check card.

15. The apparatus as claimed in claim 14 wherein said transaction memory is provided with sufficient capacity to accomodate the number of checks which a drawer might draw in a month.

* * * * *